United States Patent [19]
Onodera et al.

[11] Patent Number: 5,230,095
[45] Date of Patent: Jul. 20, 1993

[54] RADIO RECEIVER FOR DATA COMMUNICATION

[75] Inventors: Tetsuo Onodera; Kazuhide Watanabe, both of Tokyo, Japan

[73] Assignee: Oki Electric Industry Co., Ltd., Tokyo, Japan

[21] Appl. No.: 687,688

[22] Filed: Apr. 19, 1991

[30] Foreign Application Priority Data

Apr. 20, 1990 [JP] Japan ................. 2-42150[U]

[51] Int. Cl.$^5$ .............................................. H04B 1/10
[52] U.S. Cl. ................................... 455/209; 455/307; 455/315; 375/12
[58] Field of Search ................. 455/207–209, 455/307, 314–317; 375/11, 12

[56] References Cited

U.S. PATENT DOCUMENTS

| | | | |
|---|---|---|---|
| 3,942,118 | 3/1976 | Shiki | 455/314 |
| 4,726,072 | 2/1988 | Yamashita et al. | 455/315 |
| 5,034,994 | 7/1991 | Muterspaugh et al. | 455/307 |

Primary Examiner—Reinhard J. Eisenzopf
Assistant Examiner—Edward Urban
Attorney, Agent, or Firm—Spencer, Frank & Schneider

[57] ABSTRACT

A radio receiver for data communication of the type handing digital signals has a radio frequency (RF) section for receiving an RF signal having a predetermined frequency band from an electromagnetic wave which comes in through an antenna. A first frequency converting section converts the RF signal received by the RF section to a first intermediate frequency (IF) signal. A first IF filter filters the first IF signal and is implemented by a surface acoustic wave filter. A second frequency converting section converts the output signal of the first IF filter to a second IF signal. A data amplifying section picks up the above-mentioned frequency band from the output of the second frequency converting section and amplifies the resultant, picked-up band. A detector detects the output of the data amplifying section. An equalizer corrects a deviation of group delay time with each of respective frequencies of the output of the detector.

3 Claims, 4 Drawing Sheets

RADIO RECEIVER FOR DATA COMMUNICATION

BACKGROUND OF THE INVENTION

1. Field of the Invention

The present invention relates to a radio receiver for data communication of the kind handling digital signals.

2. Description of the Prior Art

A radio receiver of the type using a double superheterodyne system is one of conventional receivers applicable to data communication which handle digital signals. This type of receiver, or double superheterodyne receiver, has a radio frequency section for selecting an electromagnetic wave which comes in through an antenna. A first intermediate frequency converting section removes a carrier from a radio frequency (RF) signal selected by the radio frequency section and thereby converts it to a first intermediate frequency (IF) signal. A first bandpass filter filters out an image frequency and other undesired frequency components contained in the first IF signal and resulting from frequency conversion. The first bandpass filter has customarily been implemented by a crystal monolithic filter having an excellent narrow band characteristic.

The IF signal coming out of the first bandpass filter is further converted by a second intermediate frequency converting section to a second IF signal containing a desired signal waveform. A second bandpass filter picks up the desired signal waveform out of the second IF signal. It is a common practice to implement the second bandpass filter as a four-element ladder type ceramic filter. An AGC (Automatic Gain Control) amplifier automatically adjusts the gain of the signal waveform having been produced by the second bandpass filter. The amplified signal waveform is applied to another filter which is also implemented as a four-element ladder type ceramic filter, whereby spurious frequencies and higher harmonics which the previous ladder type filter failed to attenuate are removed. The resulting signal waveform, free from spurious frequencies and higher harmonics, is again amplified by an amplifier. This amplified signal waveform is detected by a detector to become a data signal. An equalizer corrects the delay of the data signal ascribable to the two successive ladder type filters and then transfers it to a data processing section.

The conventional double superheterodyne receiver having the above construction has various problems left unsolved, as follows. The first bandpass filter constituted by a crystal monolithic filter as stated causes spurious emissions to occur due to mechanical oscillations thereof. Since such a first bandpass filter is not capable of attenuating spurious frequencies to a satisfactory degree, both the second bandpass filter and the filter which follows it have to be implemented by a four-element ladder type ceramic filter in order to fully remove the spurious components. The drawback with a ladder type filter is that it is complicated in construction and expensive. Moreover, a four-element ladder type filter inherently delays a signal passing therethrough. The use of two four-element ladder type filters, therefore, aggravates the delay, resulting in the need for a complicated equalizer.

SUMMARY OF THE INVENTION

It is therefore an object of the present invention to provide a radio receiver for data communication which is simple in construction and low cost.

In accordance with the present invention, a radio receiver for data communication of the type handing digital signals has a radio frequency (RF) section for producing an RF signal having a predetermined frequency band from an electromagnetic wave which comes in through an antenna. A first frequency converting section conerts the RF signal received by the RF section to a first intermediate frequency (IF) signal. A first IF filter filters the first IF signal and is implemented by a surface acoustic wave filter. A second frequency converting section converts the output signal of the first IF filter to a second IF signal. A data amplifying section picks up the above-mentioned frequency band from the output of the second frequency converting section and amplifies the resultant, picked-up band. A detector detects the output of the data amplifying section. An equalizer corrects a deviation of group delay time with each of respective frequencies of the output of the detector.

BRIEF DESCRIPTION OF THE DRAWINGS

The objects and features of the present invention will become more apparent from the consideration of the following detailed description taken in conjunction with the accompanying drawings in which:

FIG. 1A is a block diagram showing an alternative embodiment of block 16 in FIG. 1.

DESCRIPTION OF THE PREFERRED EMBODIMENT

Figure 1:
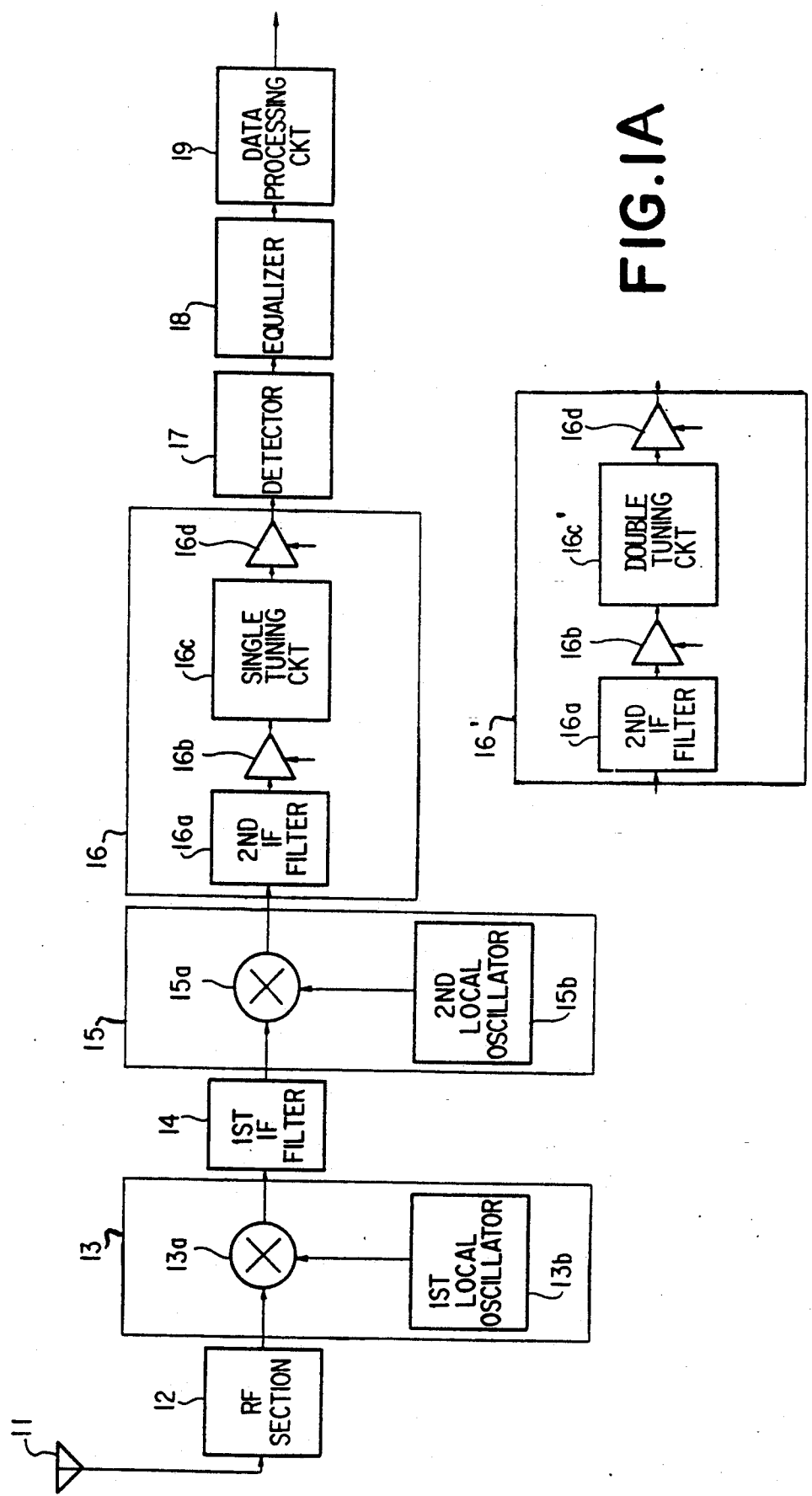
FIG. 1 is a block diagram showing a preferred embodiment of the radio receiver for data communication in accordance with the present invention.

Referring to FIG. 1 of the drawings, a radio receiver for data communication embodying the present invention is shown and implemented as a double superheterodyne receiver. This kind of radio receiver is applicable to a cellular mobile radio communication system, for example. As shown in the figure, the receiver has an antenna 11 for receiving electromagnetic waves lying in the frequency band of 800 megahertz, for example. An electromagnetic wave coming in through the antenna 11 is applied to a radio frequency (RF) section 12. The RF section is tuned to a desired frequency band from the electromagnetic wave. The RF section 12 includes a receive filter in the form of, for example, a dielectric filter. The dielectric filter plays the role of an antenna duplexer which is shared by the receiver and a transmitter, not shown. In this case, the dielectric filter constitutes a λ/4 resonator.

The output of the RF section 12 is connected to a first frequency converting section 13 which is made up of a mixer 13a and a first local oscillator 13b connected to the mixer 13a. The RF signal tuned by the RF section 12 as stated above is applied to the mixer 13a. The mixer 13a mixes the RF signal and the output of the local oscillator 13b to produce an intermediate frequency (IF) signal. The IF signal frequency band is 80 megahertz, for example.

The output of the first frequency converting section 13 is connected to a first IF filter 14. The IF filter 14 filters out an image frequency and other undesired frequency components contained in the output signal of the mixer 13a, i.e. 80 MHz IF signal. This IF filter 14 is one of characteristic features of the illustrative embodiment and is implemented as a surface acoustic wave (SAW) filter. The IF filter or SAW filter 14 has a piezoelectric substrate made of PZT ceramics, for example, and an inter-digital-transducer (IDT) made of aluminum or similar material and formed on the surface of the piezoelectric substrate. Regarding the piezoelectric substrate, a substance other than PZT ceramics, e.g., lithium niobium trioxide ($LiNbO_3$), lithium tantalum trioxide ($LiTaO_3$) or crystal may be used. While a major component of the IDT or electrode is aluminum which is inherently low in propagation loss, 0.5 percent to 4 percent of copper is added to aluminum. In the IF filter or SAW filter 14, an electric signal incident to the input electrode is propagated as an elastic surface acoustic wave along the surface of the substrate. At the output electrode of the SAW filter 14, the elastic surface wave is tuned to a surface acourstic wave of desired frequency to be thereby converted into an electric signal. It is noteworthy that a SAW filter causes hardly any spurious emission to occur since it does not rely on oscillations due to the distortion of a crystal which a crystal filter uses.

The output of the IF filter 14 is connected to a second frequency converting section 15 which is made up of a mixer 15a and a second local oscillator 15b connected to the mixer 15a. The mixer 15a mixes the output signal of the first IF filter 14 and the output signal of the second local oscillator 15b to produce a second IF signal whose frequency is 455 kilohertz.

A data amplifying section 16 is connected to the output of the second frequency converting section 15. The data amplifying section 16 is made up of a second IF filter 16a connected to the output of the mixer 15a, a first AGC amplifier 16b connected to the output of the IF filter 16a, a single tuning circuit 16c connected to the output of the AGC amplifier 16b, and a second AGC amplifier 16d connected to the output of the tuning circuit 16c. The second IF filter 16a is implemented as a four-element ladder type ceramic filter and picks up a desired waveform of given frequency from the output waveform of the second frequency converting section 15. The first AGC amplifier 16b automatically controls the gain in response to an AGC voltage which is fed back from a detector 17 which will be described. At the same time, the AGC amplifier 16b amplifies the output of the IF filter 16a.

The single tuning circuit 16c removes spurious frequencies and higher harmonics which the filter 16a has failed to filter out. The single tuning circuit 16c is another characteristic feature of the illustrative embodiment and is a substitute for the conventional four-element ladder type ceramic filter which is complicated and delays a signal, as stated earlier. The tuning circuit 16c is simple in construction and causes a minimum of signal delay, as will be described hereinafter. According to another embodiment of the invention, a data amplifying section 16' including a double tuning circuit 16c' may be used as shown in FIG. 1A in place of the data amplifying section 16 with the single tuning circuit illustrated in FIG. 1.

Figure 2:
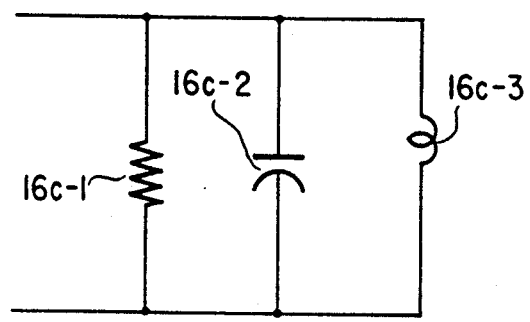
FIG. 2 is a circuit diagram showing a specific construction of a single tuning circuit included in the embodiment.

FIG. 2 shows a specific construction of the single tuning circuit 16c. As shown, the single tuning circuit 16c is constituted by a parallel connection of a resistor 16c-1, a capacitor 16c-2, and a coil 16c-3. With this configuration, the single tuning circuit 16c has an attenuating or tuning characteristic a which is expressed as:

$$a = [1 + Q^2(\omega/\omega_0 - \omega_0/\omega)^2]^{\frac{1}{2}} \qquad \text{Eq. (1)}$$

where $\omega_0$ and $\omega$ are the center angular frequency and the detune angular frequency, respectively.

Also, the single tuning circuit 16c has a phase characteristic $\Phi$ which is represented by:

$$\Phi = \tan^{-1} Q(\omega/\omega_0 - \omega_0/\omega) \qquad \text{Eq. (2)}$$

Figure 4:
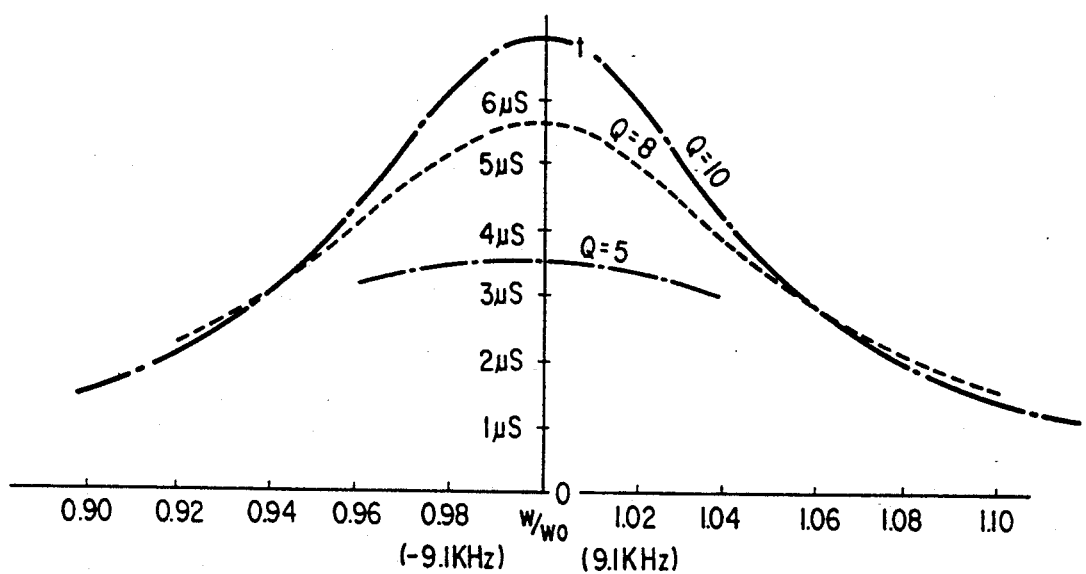
FIG. 4 is a graph representative of a delay characteristic particular to the tuning circuit of the embodiment.
Figure 5:
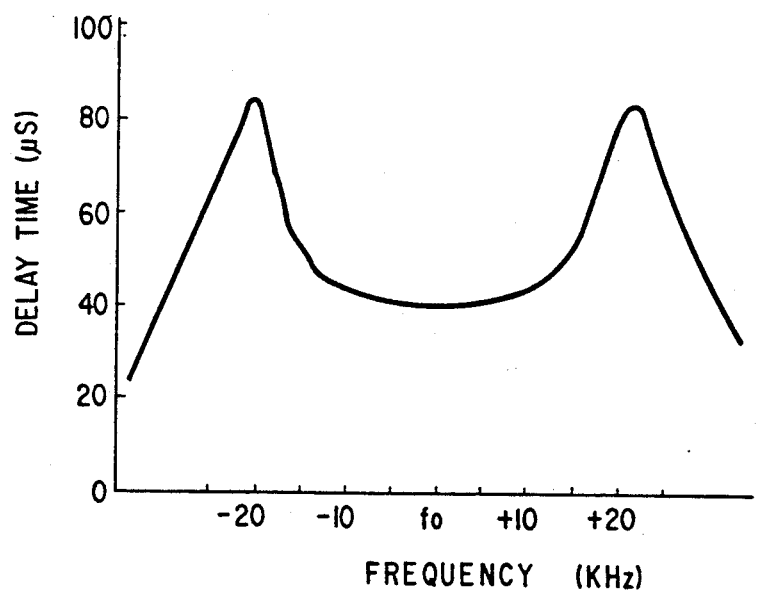
FIG. 5 is a graph indicative of a delay time characteristic of a second intermediate frequency filter included in the embodiment.

The single tuning circuit 16c delays a signal passing therethrough by a time t which is $\Delta\Phi/\Delta\omega$. This delay time t and the above Eqs. (1) and (2) give a delay characteristic particular to the tuning circuit 16c, as shown in FIG. 4. As FIG. 4 indicates, the delay time of a signal caused by the single tuning circuit 16c sequentially decreases as the frequency is detuned from the center frequency. On the other hand, FIG. 5 is a graph showing a delay time characteristic of the four-element ladder type ceramic filter 16a. As shown in FIG. 5, the ladder type ceramic filter 16a increases the delay time as the frequency is detuned from the center frequency, as far as the frequency band thereof is concerned. Eventually, the tuning circuit 16c operates in such a manner as to reduce, though not completely, the deviations of delay time ascribable to the filter 16a. Hence, the delay time of a signal occurring in the data amplifying section 16 is noticeably reduced.

The second AGC amplifier 16d amplifies the output signal of the single tuning circuit 16c while automatically controlling the gain in response to an AGC voltage which is also fed back from the detector 17.

The detector 17 is connected to the output of the data amplifying section 16 to detect the output signal of the AGC amplifier 16d. An equalizer 18 is connected to the output of the detector 17 to reduce the deviation of the group delay time for each of the frequencies at the output of the detector 17, i.e. baseband signal. A data processing circuit 19 is connected to the output of the equalizer 18. The output of the data processing circuit 19 is connected to a printer or similar output terminal, not shown.

Figure 3:
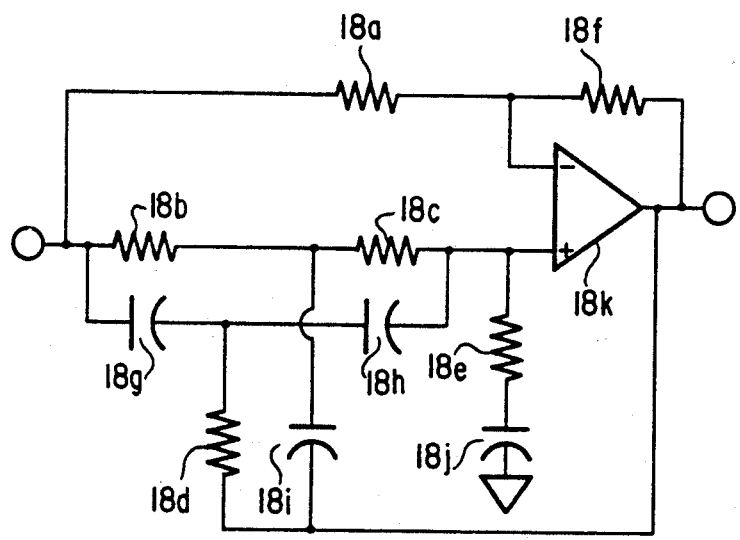
FIG. 3 is a circuit diagram showing a specific construction of an equalizer also included in the embodiment.

Referring to FIG. 3, a specific construction of the equalizer 18 will be described. As shown, the equalizer 18 is made up of resistors 18a to 18f, capacitors 18g to 18j, and an operational amplifier (OP AMP) 18k. The resistors 18b and 18c and the capacitors 18g, 18h and 18i constitute a twin T circuit for producing a predetermined phase. On the other hand, the OP AMP 18k and resistor 18f constitute a non-inverting amplifier circuit in combination. The output of the twin T circuit is fed to the non-inverting input of the OP AMP 18k while a direct wave is applied to the inverting input of the OP AMP 18k. A difference between the output of the twin T circuit and the direct wave appears on the output of the OP AMP 18k. This difference is fed back to the inverting input of the OP AMP 18k to reduce the delay time of the signal.

In operation, an electromagnetic wave coming in through the antenna 11 is filtered by the RF section 12 and then converted to a first IF signal by the mixer 13a and first local oscillator 13b. The first IF signal is applied to the first IF filter 14 to remove an image frequency ascribable to frequency conversion and spurious frequencies emitted by other circuits. The first IF signal free from such undesired waves is converted to a second IF frequency by the mixer 15a and second local oscillator 15b. The second IF signal is fed to the second IF filter or four-element ladder type ceramic filter 16a. In response, the filter 16a separates only the desired wave by insuring the selectivity around the center frequency of the desired wave. Thereafter, the desired wave is amplified by the AGC amplifier 16b and then applied to the single tuning circuit 16c. The tuning circuit 16c removes sufficiently remote noise from the input signal. The output of the tuning circuit 16c is amplified by the second AGC circuit 16d and then transformed to a baseband signal by the detector 17. The baseband signal is equalized by the equalizer 18 and then fed to the data processing circuit 19.

In summary, the embodiment shown and described has various advantages over the conventional radio receiver, as follows.

The single tuning circuit 16c which is a substitute for the conventional four-element ladder type ceramic filter is broader in operation bandwidth and smaller in time delay. This enhances rapid control over the AGC amplifiers 16b and 16d.

Figure 6:
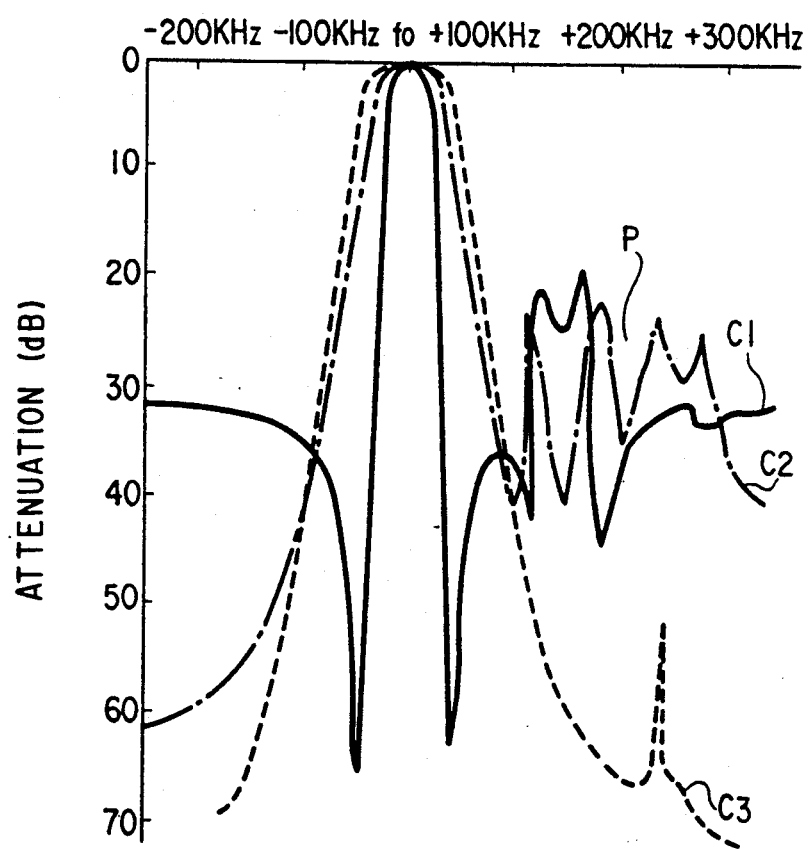
FIG. 6 is a graph showing attenuation characteristics of a four-element ladder type ceramic filter, a crystal monolithick filter, and a surface acoustic wave filter.

FIG. 6 shows curves C1, C2 and C3 representative of the attenuation characteristics of a four-element ladder type ceramic filter, a crystal ceramic filter, and a surface acoustic wave filter, respectively. As the curve C2 indicates, a crystal ceramic filter customarily built in a first IF filter involves spurious components P and, therefore, fails to insure a required degree of attenuation. Hence, such a filter has to be accompanied by a data amplifying section having two four-element ladder type ceramic filters, as discussed previously. By contrast, the illustrative embodiment replaces the crystal ceramic filter with a surface acoustic wave filter which involves a minimum of spurious components. Hence, one of the filters included in the data amplifying section can be implemented by the simple tuning circuit, simplifying the construction of the data amplifying section.

A conventional equalizer corresponding to the equalizer 18 in FIG. 1, needs two consecutive circuits each having the construction shown in FIG. 3. In the illustrative embodiment, the simple tuning circuit 16c built in the data amplifying section 16 is successful in reducing the deviation of delay time in the frequency band and, therefore, having the required number of components of the equalizer.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention. For example, the single tuning circuit 16c shown and described may be replaced with the double tuning circuit 16c of FIG. 1A. The construction of the equalizer shown in FIG. 3 is only illustrative and may be replaced with any other suitable construction. Further, the four-element ladder type ceramic filter implementing the second IF filter 16a may be replaced with another suitable type of filter, if desired.

What is claimed is:

1. A radio receiver for digital data communication, comprising:
    a radio frequency section for receiving a radio frequency signal having a predetermined frequency band from an electromagnetic wave coming in through an antenna;
    a first frequency converting section for converting said radio frequency signal received by said radio frequency section to first intermediate frequency signal;
    a first intermediate frequency filter for filtering said first intermediate frequency signal;
    a second frequency converting section for converting an output signal of said first intermediate frequency filter to a second intermediate frequency signal;
    a data signal amplifying section for isolating said frequency band from an output of said second frequency converting section and amplifying a result of isolation;
    a detector for detecting an output of said data signal amplifying section; and
    an equalizer for correcting a deviation of group delay time with each of respective frequencies of an output of said detector wherein;
    said first intermediate frequency filter comprises a surface acoustic wave filter;
    said data signal amplifying section includes: a second intermediate frequency filter for isolating a desired signal wave from the second intermediate frequency signal fed from said second frequency converting section at least one amplifier for amplifying an output of said second intermediate frequency filter; and a tuning circuit for filtering an output of said amplifier; and
    said equalizer comprises a phase circuit for producing a predetermined phase of the data signal based on the signal fed from said detector; and a non-inverting amplifier circuit for outputting a desired data signal which is reduced in delay time relative to the data signal from said detector based on the predetermined phase fed from said phase circuit.

2. A radio receiver in accordance with claim 1, wherein said turning circuit comprises a single tuning circuit.

3. A radio receiver in accordance with claim 1, wherein said tuning circuit comprises a double tuning circuit.

* * * * *